United States Patent
Kirkpatrick et al.

(10) Patent No.: US 7,084,519 B2
(45) Date of Patent: Aug. 1, 2006

(54) ELECTRIC POWER GENERATION ARRANGEMENT WITH ROTARY CABLING GUIDE

(75) Inventors: Samuel J. Kirkpatrick, Carrickfergus (GB); Michael R. McClelland, Lisburn (IE); Bryan J. McKibbin, Ahoghill (IE); Raymond M. Pritchard, Bangor (IE)

(73) Assignee: FG Wilson (Engineering) Limited (IE)

( * ) Notice: Subject to any disclaimer, the term of this patent is extended or adjusted under 35 U.S.C. 154(b) by 0 days.

(21) Appl. No.: 11/353,781

(22) Filed: Feb. 14, 2006

(65) Prior Publication Data
US 2006/0125239 A1   Jun. 15, 2006

Related U.S. Application Data

(62) Division of application No. 10/962,918, filed on Oct. 12, 2004.

(60) Provisional application No. 60/529,595, filed on Dec. 16, 2003.

(51) Int. Cl.
*H02K 5/22* (2006.01)

(52) U.S. Cl. ..................... 290/1 R; 439/131
(58) Field of Classification Search ............. None
See application file for complete search history.

(56) References Cited

U.S. PATENT DOCUMENTS 5,925,851 A * 7/1999 Sugahara ............... 174/65 G
6,838,612 B1 * 1/2005 Krug ..................... 174/21 JR

FOREIGN PATENT DOCUMENTS

DE      10106153 A1 *  9/2001
EP       1385254 A2 *  1/2004

* cited by examiner

*Primary Examiner*—Joseph Waks
(74) *Attorney, Agent, or Firm*—John J. Cheek

(57) ABSTRACT

Electric power generation (EPG) arrangements, such as generator sets for example, can be constructed with many different configurations depending on customer needs. Variations in the configuration include the placement of a circuit panel relative to a generator and the length of the generator. Multiple different electrical power transmission cabling arrangements are traditionally required to accommodate multiple circuit panel/generator configurations. An electrical power generation arrangement including a cabling guide that is positionable, as by rotation for example, in one of a plurality of rotary positions relative to the generator. The cabling guide is positioned in a selected rotary position based on the position of the circuit panel relative to the generator or the length of the generator or both. A cabling conduit can be connected between the guide and the circuit panel. Power transmission cabling extends from the generator through the cabling guide and through conduit to the circuit panel. The cabling guide permits ready customization to individual customer specifications regarding circuit panel placement and generator length or both.

7 Claims, 7 Drawing Sheets

Fig_1_

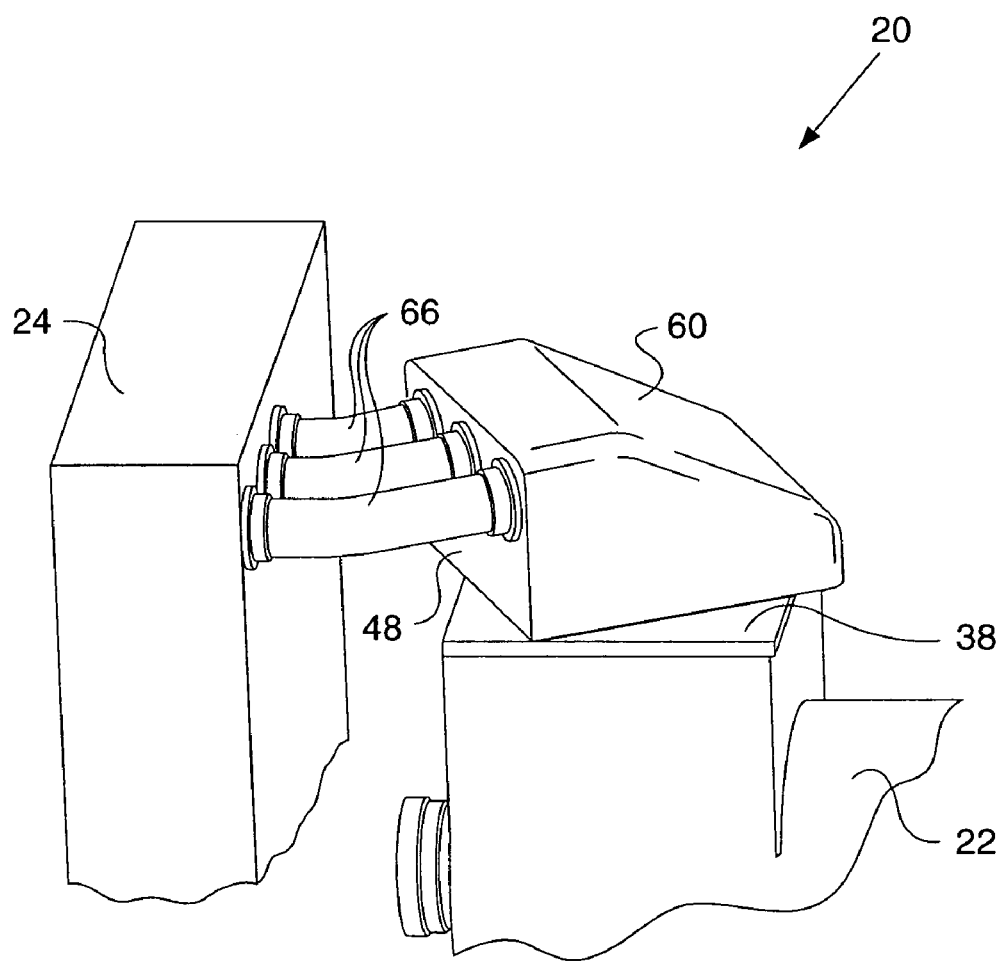

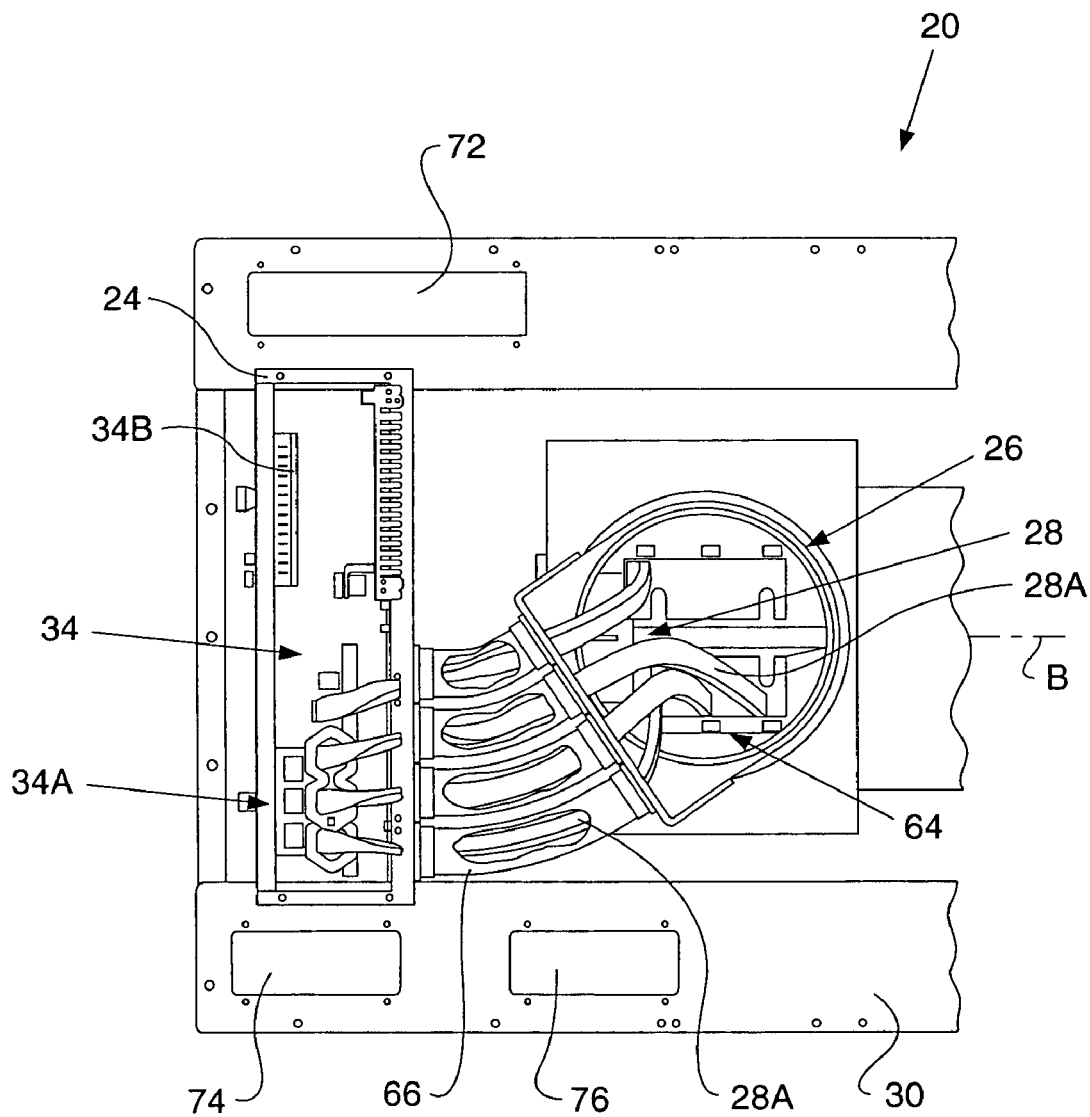
Fig_4_

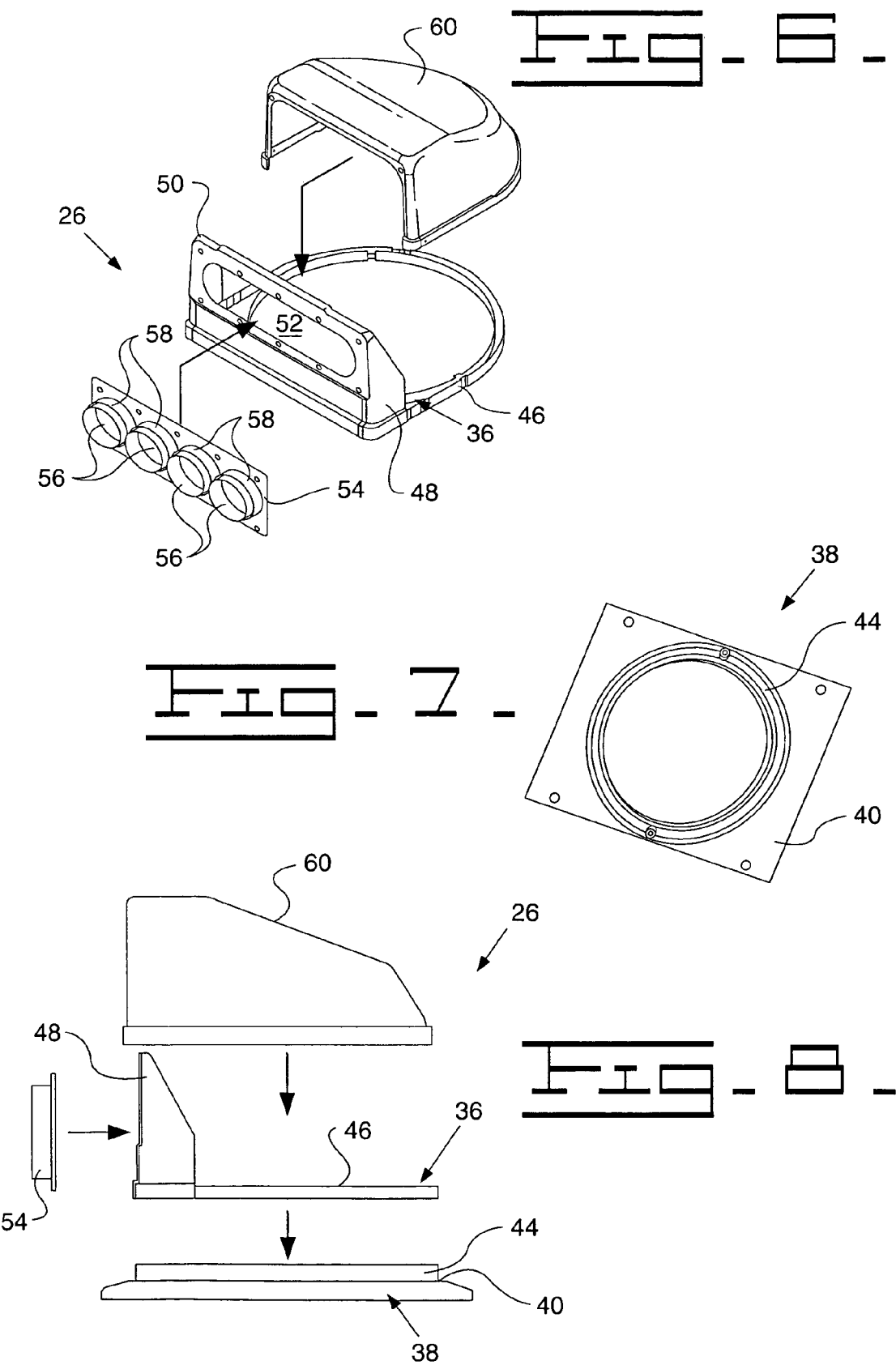

US 7,084,519 B2

ELECTRIC POWER GENERATION ARRANGEMENT WITH ROTARY CABLING GUIDE

CROSS-REFERENCE TO RELATED APPLICATIONS

This is a division of application Ser. No. 10/962,918 filed on Oct. 12, 2004, which claims the benefit of provisional Application No. 60/529,595 filed on Dec. 16, 2003.

TECHNICAL FIELD

This disclosure generally relates to electric power generation arrangements, such as generator sets for example. More particularly and without limitation, this disclosure relates to an electric power generation arrangement that includes a power transmission cabling guide positionable relative to a generator a plurality of rotary positions.

BACKGROUND

Electric power generation (EPG) arrangements, such as generator sets for example, typically include a generator that is electrically connected to a breaker circuit. To accommodate varying customer needs, EPG arrangements have been customizable to provide either a rear-mounted breaker circuit or a side-mounted breaker circuit. As a result, different power transmission cabling arrangements were required for each breaker circuit mounting location. Dedicated drop-over generator enclosures or long cabling trunk runs have been used to accommodate the various cabling arrangement. Accordingly, providing the customer with multiple options for the location of the breaker circuit relative to the generator was costly and complicated.

In addition, customization of EPG arrangements can also include offering generators from various manufacturers or having various capacities. Generators can vary in length depending on the manufacturer or capacity. Consequently, these different generator lengths require still additional cabling arrangements, thus further increasing the cost and complexity of providing the customer multiple configuration options.

In some cases, the breaker circuit has been mounted on the generator housing itself to avoid problems of providing cabling from the generator to the breaker circuit. However, this arrangement is believed to be undesirable for EPG arrangements using acoustic, noise-attenuating enclosures. The arrangement is undesirable because airflow in such enclosures can be critical and control circuit panels, which are desirably accessible from outside of the enclosure must generally be placed nearby the breaker circuit, which is inside the enclosure, thus limiting flexibility for airflow paths.

This disclosure is directed toward overcoming one or more of the problems identified above.

SUMMARY OF THE INVENTION

According to one aspect, an EPG arrangement comprises a generator, a circuit panel positioned adjacent to the generator, a cabling guide positioned adjacent to the generator and being positionable relative to said generator in one of a plurality of rotary positions, and power transmission cabling connected between the circuit panel and the generator, the cabling extending through the cabling guide.

According to another aspect, a method for electrically connecting a generator to a circuit panel in an EPG arrangement is disclosed. The method includes positioning a circuit panel relative to a generator, positioning a cabling guide relative to the generator in one of a selectable plurality of rotary positions, extending power transmission cabling such that it extends through the cabling guide, and electrically connecting the power transmission cabling to the circuit panel and the generator.

According to still another aspect, a method for providing a customer an EPG arrangement having one of a plurality of customer selectable configurations is disclosed. The method includes the step of accepting a customer order for an EPG arrangement specifying one of a plurality of customer selectable configurations, the customer selectable configurations varying based on at least one of (i) the positioning of a circuit panel relative to a generator, and (ii) alternator length in configurations where the generator comprises an alternator having a rotor axis and having an alternator length measured in a direction parallel to the rotor axis. The method further includes the steps of constructing a power generation arrangement based on the selectable configuration specified in the customer order, the constructing step including electrically connecting the generator to the circuit panel according to the method described in the immediately preceding paragraph. The cabling guide is placed in a rotary position suitable for the selectable configuration specified in the customer order.

Other aspects and features will be apparent from the following description and the accompanying drawings.

BRIEF DESCRIPTION OF THE DRAWINGS

FIG. 3 is an enlarged, fragmentary perspective view of a portion of the embodiment of FIG. 1.

FIG. 4 is fragmentary plan view of another embodiment of an EPG arrangement similar to the embodiment of FIG. 1 but with certain parts removed and certain parts shown as semi-transparent for illustration purposes.

FIG. 6 is an exploded perspective view of a cabling guide as described herein.

FIG. 7 is a perspective view of a cabling guide base as described herein.

FIG. 8 is an exploded side elevational view of a cabling guide as described herein.

DETAILED DESCRIPTION

Figure 1:
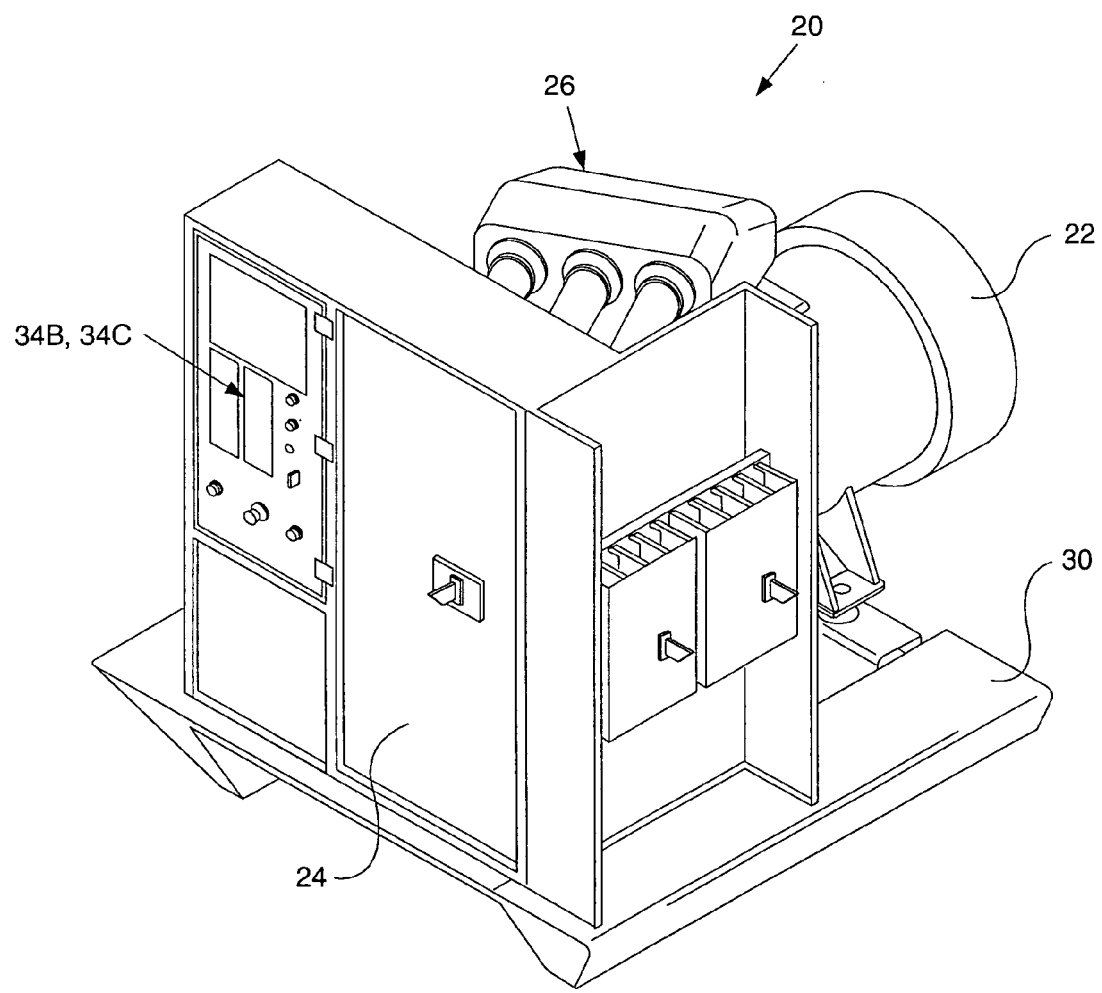
FIG. 1 is a fragmentary perspective view of an embodiment of electric power generation (EPG) arrangement as described herein.

FIGS. 1 through 4 illustrate an electric power generation (EPG) arrangement generally designated 20. The power generation arrangement 20 includes a generator 22, a circuit panel 24 positioned adjacent to the generator 22, and a cabling guide, generally designated 26, positioned adjacent to the generator 22 and the circuit panel 24. The cabling guide 26 is positionable relative to the generator 22 in one of a plurality of rotary positions and can be rotatable relative to the generator 22 about an axis A. Power transmission cabling, generally designated 28, is connected between the circuit panel 24 and the generator 22 and extends through the cabling guide 26. The generator 22 and the circuit panel 24 can be mounted to a base or frame 30, which can be conventional except as specifically described herein.

The term "generator" can include a conventional dynamoelectric alternator having a rotating armature or rotor and a fixed stator, hydrogen or other fuel cell, a solar power cell, or any other device for producing electrical power. In embodiments using a conventional dynamoelectric alternator, such as illustrated in the figures and designated 32, the alternator may be driven by any suitable motive source (not shown), such as a spark-ignited or compression-ignited reciprocating piston engine or a diesel or natural gas powered turbine engine for example. The invention is conveniently illustrated using an alternator 32 that includes a rotor, partially shown at 32A, generally positioned within an alternator housing 32B, with the rotor 32A rotating about a rotor axis B. The illustrated rotor axis B is substantially perpendicular to the axis A of the cabling guide 26, but the axes A and B need not be perpendicular and can be otherwise transverse or even parallel to each other. The alternator 32 is considered to have a length measured in a direction parallel to its rotor axis B, and such length can vary depending on the manufacturer or the capacity of the alternator or both.

With reference to FIG. 4, the illustrated circuit panel 24 includes circuits 34 such as conventional breaker circuits 34A, conventional control circuits 34B, and conventional status monitors 34C (FIG. 1), although the circuit panel 24 could include any combination of such circuits or monitors. The breaker circuit 34A may be a 3-pole breaker (plus earth or ground) as shown in FIG. 4, but a 4-pole or other breaker circuit could be used. The control circuits 34B, which can be conventional and are thus not shown in detail, can include, by example only, printed circuit board, relays, switches, fuses, and additional breaker circuits. The status monitors 34C, which are also not shown in detail, can include conventional digital or analog displays or gauges. The circuit panel 24 may also include optional connection points (not shown) for users to provide current to auxiliary devices such as a water heater or a battery heater for example Referring also to FIGS. 5A through 5D, the cabling guide 26 is a turret-like structure that can be located atop the generator 22 and is positionable relative to the generator 22 in one of a plurality of rotary positions. As used herein, "rotary position" is intended to mean an angular orientation relative to a reference axis. For example, the term "rotary position" includes rotational positions where the cabling guide 26 is rotatable about the axis A. The term "rotary position" also includes angular orientations obtained by placement of the cabling guide 26 in one of a plurality of rotationally fixed but selectable angular orientations, (for example by using key-keyway structures or polygonal shaped interfitting parts as discussed later). In this regard, the angular orientation may be rotationally fixed in an absolute sense or, by way of a detent structure, relatively fixed unless sufficient non-destructive angular force is applied. The cabling guide 26 is turret-like inasmuch as it is rotatable to guide the power transmission cabling 28 in a plurality of selectable directions away from the generator 22.

FIGS. 5A through 5D illustrate the cabling guide 26 is various rotary positions and also show the circuit panel positioned in various circuit panel mounting locations on the frame 30.

Figure 2:
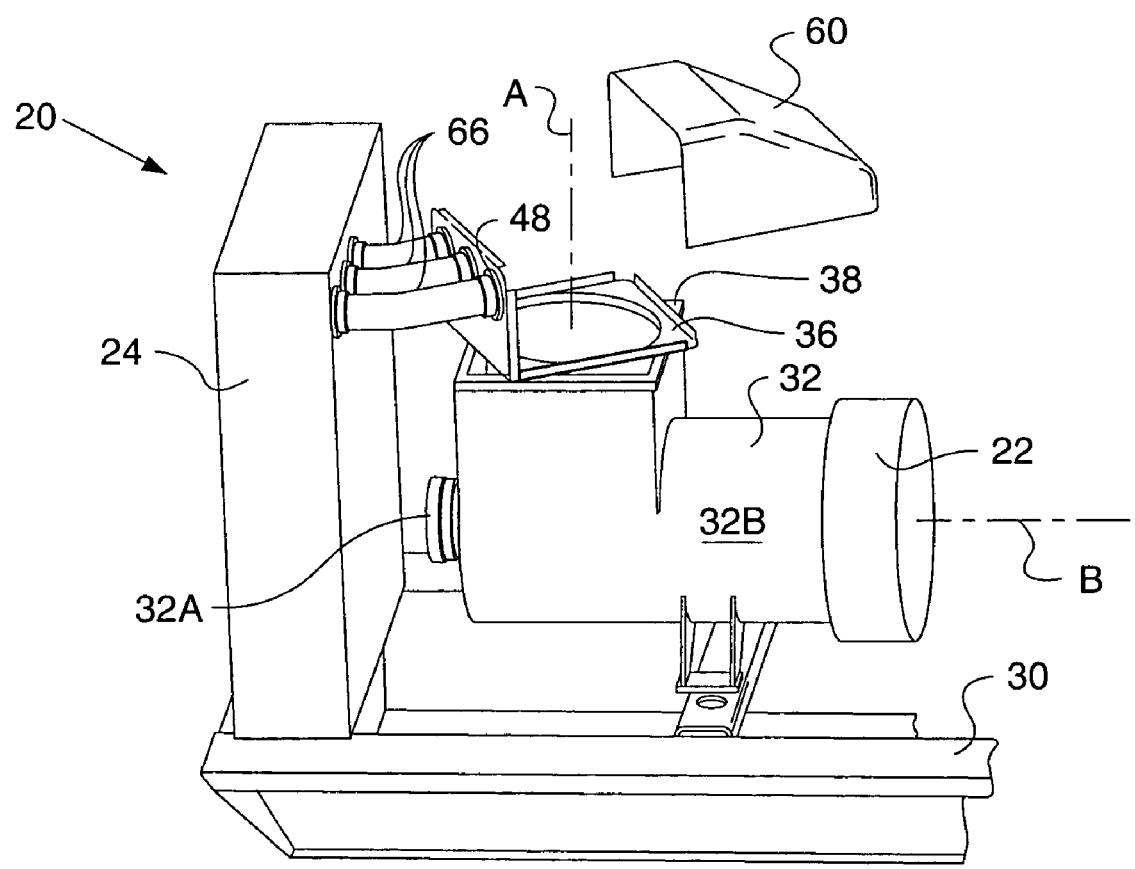
FIG. 2 is a partially exploded perspective view of the embodiment of FIG. 1 from a different angle.
Figure 5A:
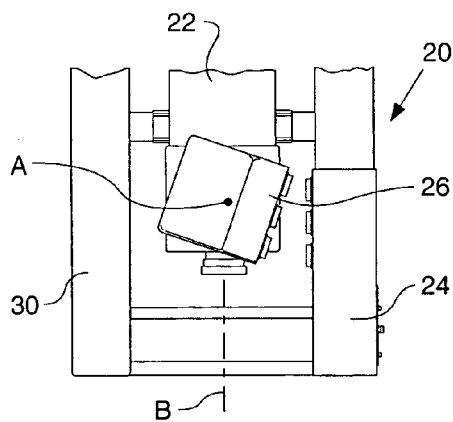
FIGS. 5A through 5D are fragmentary plan views of the embodiment of FIG. 1 each showing a cabling guide in one of a plurality of positions and also showing a plurality of circuit panel mounting locations.
Figure 5B:
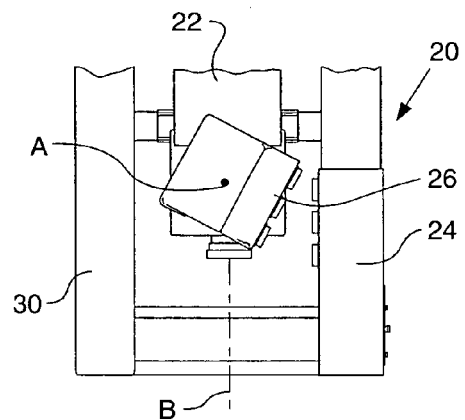
Figure 5C:
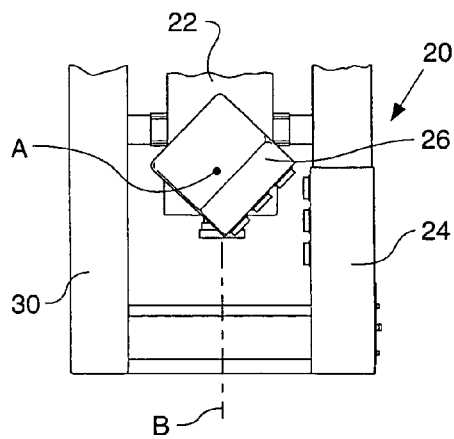
Figure 5D:
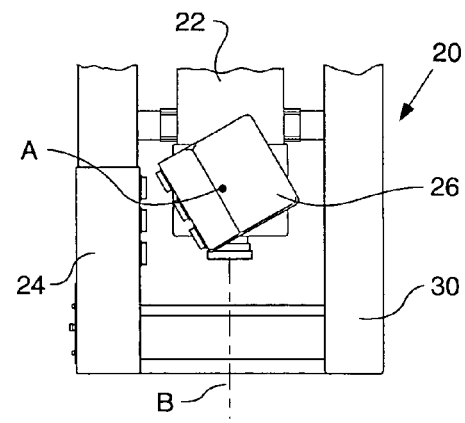

Referring particularly to FIGS. 6 through 8, the cabling guide 26 includes a body 36 rotatably mounted to a base 38 that is fixed in relation to the generator 22. In the illustrated embodiment, the base 38 comprises a base plate 40 mounted to an alternator housing 32B (FIG. 2). The base plate 40 includes an upstanding circular wall or bearing 44. The body 36 includes a circular bearing portion 46 sized to match the circumference of upstanding wall 44 so that the body 36 can be positioned atop the base 38 such that the wall 44 is received within the bearing portion 46. Thus, the wall 44 defines a circular bearing about which the body 36 is rotatable relative to the cabling guide axis A. The body 36 also includes an upstanding portion 48 extending or lying in a plane substantially parallel to the axis A. Of course, the upstanding portion could lie in other planes. The upstanding portion 48 includes a frame 50, which defines a window 52, and an aperture wall 54 fastened to the frame 50. The aperture wall 54 defines one or more cabling apertures 56 that open through the window 52 when the aperture wall 54 is mounted to the frame 50.

The illustrated aperture wall 54 includes four apertures 56, but the aperture wall 54 may include any number of apertures 56. The cabling apertures 56 may also be formed directly in the body 36, but use of a separate aperture wall 54 may be desirable to allow easy customization of the number of cabling apertures 56 while using a common body 36. The aperture wall 54 can include a tubular wall 58 around each cabling aperture 56. The walls 58 may be chamfered at their free ends as shown in FIG. 6 and provide a connection point for cabling conduits as discussed hereafter. As apparent, the apertures 56 can be positioned to open generally toward the circuit panel 26 by rotating the cabling guide body 36 relative to the base 38 or otherwise positioning the body 36 in a desired rotary position. The cabling guide 26 can include a hood or cover 60 removably fastened to the body 36 to define a substantially closed space through with the power transmission cabling 28 can extend. The cover 60 can be provided with a top lip that overlaps the upper edge of the aperture plate 54 to thus provide a generally drip-proof enclosure.

The parts forming the cabling guide structure can be made from any suitable material. For example, the body 36, the base 38, and the cover 60 may be thermoformed from a suitable acrylic capped ABS plastic material and the aperture wall 54 may be injection molded from a suitable nylon material.

Figure 9:
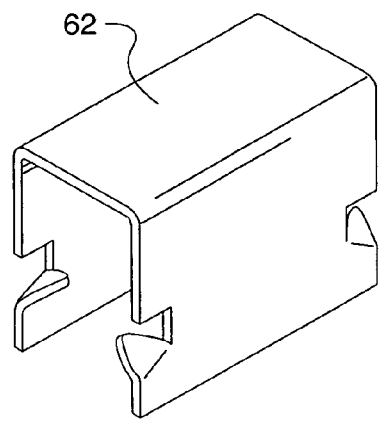
FIG. 9 is a perspective view of a cabling guide clip as described herein.

As mentioned above, the body 36 of the cabling guide 26 is rotatable relative to the base 38 to a plurality of rotary positions. The body 26 may be fixed in its desired rotary position by way of one or more clips 62 as shown in FIG. 9 that fit over the circular bearing portion 46 of the body 26 and the wall 44 of the base 38. The clips 62 also prevent the body 36 from coming unseated from its position atop the base 38. Other suitable clips or structures may be used to prevent relative motion.

The cabling guide 26 need not be rotatable relative to the generator 22 but instead only need be positionable in a plurality of rotary positions. Thus, for example, the base 38 may be fitted with a plurality of angularly spaced keys (not shown) receivable in corresponding angularly spaced keyways (not shown) in the body 36 (or vice versa), thus permitting the body 36 to be fitted to the base 38 in plural rotary positions. For example, an arrangement of three equally angularly spaced keys and keyways would permit selection of three rotary positions angularly spaced by 120 degrees and, in generally, the angular spacing between rotary positions is determined as the quotient of 360 degrees divided by the number of equally spaced keys provided. Of course, the keys need not be equally spaced. A similar result is obtained by forming the bearing wall 44 and the bearing portion 46 in the shape of regular or irregular polygons. In these non-rotatable arrangements, the rotary position of the cabling guide 26 is fixed after the body 36 is positioned atop the base 38 unless an angular force sufficient to shear the keys or to deform the parts is applied to the body 36. Suitable clips as described above or other structure can be used to prevent movement of the body 36 away from the base 38. A detent arrangement (not shown) might also be used wherein the rotary position of the body 36 relative to the base 38 is fixed unless a sufficient non-destructive rotary force is applied, thus allowing rotation of the body 36 after fitting but not as a result of small, unintentional forces applied to the body 36.

Figure 10:
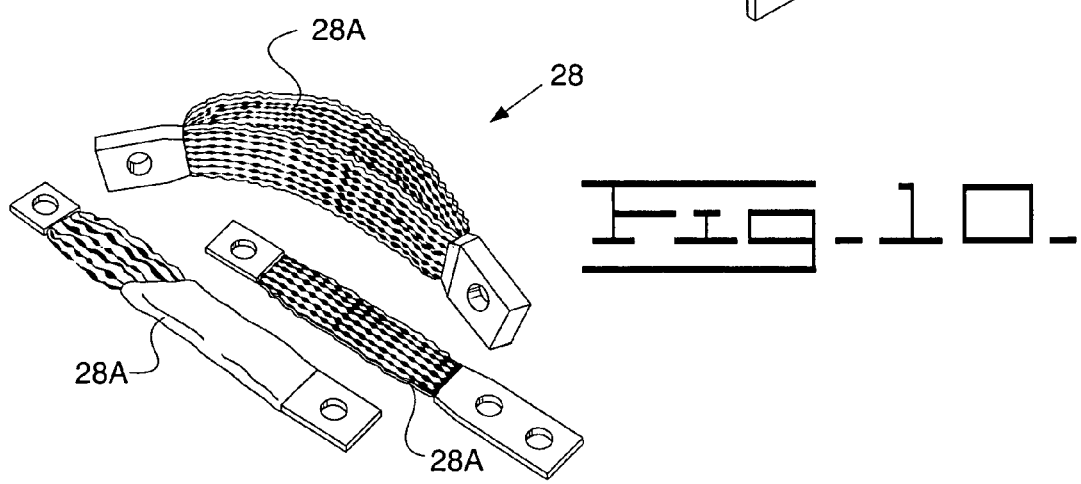
FIG. 10 is a perspective view of exemplary cabling as described herein.

With particular reference to FIGS. 4 and 10, the power transmission cabling 28 is electrically connected between power outlet terminals 64 of the generator 22 and the circuit panel 24. The illustrated power transmission cabling 28 includes plural cables 28A each connected and extending between the generator 22 and the circuit panel 24, but a single cable could also be used. The term "cabling" as used herein refers to conventional power transmission cabling as commonly used in diesel generator sets, copper braids as shown in detail in FIG. 10, or any suitable transmission medium. With reference to FIG. 10, the copper braids comprise a plurality of braided copper strands connected between two tab-like connectors adapted for connection to the circuit panel 24 and the generator terminals 64. The copper strands are typically coated with a suitable insulating material, as partially shown in FIG. 10, but uninsulated cabling may be used subject to local requirements.

Figure 11:
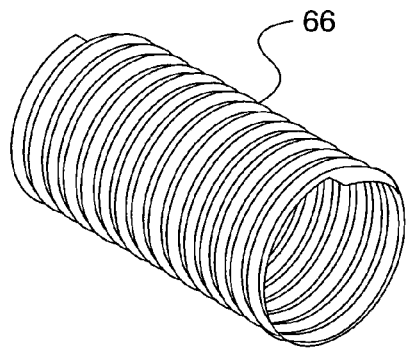
FIG. 11 is a perspective view of a cabling conduit as described herein.
Figure 12:
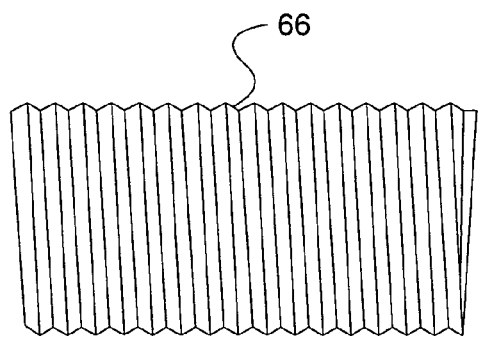
FIG. 12 is a side elevational view of the cabling conduit shown in FIG. 11.

Referring also to FIGS. 11 and 12, the power transmission cabling 28 can extends through optional flexible cabling conduits 66 connected at one end to the cabling guide 26 and at the other end to the circuit panel 24. The conduits are shown as semi-transparent if FIG. 4 for illustration purposes. The illustrated embodiments shows plural conduits 66—one corresponding to each cabling aperture 56 or one corresponding to each cable 28A—but the cabling 28 may extend through a single conduit 62. The conduits 66 may be formed from PVC plastic material reinforced with corrosion resistant PVC coated spring steel wire. The conduits 66 are optional inasmuch as they are not necessary to achieve the benefits of the cabling guide 26, but suitable insulating conduits may be necessary in some jurisdictions based on local laws and codes, especially if uninsulated cabling is used. The conduits 62 are desirably flexible to permit a single conduit design to be used with multiple circuit panel locations, but rigid conduits customized based on circuit panel location could also be used. The conduits 66 can be connected to the circuit panel 24 and the cabling guide 26 in any suitable manner. In this regard, the tubular walls 58 around each cabling aperture 56 as described above can be constructed as to receive the ends of the conduits 66, for example in a groove or the like (not shown), and the conduits can be fixed in position by self-tapping screws or other fasteners extending into both the walls 58 and the conduits 66. A similar connection can be made at the circuit panel ends of the conduits.

With reference to FIG. 4, the frame 30 is generally conventional but can be provided with a plurality of selectable predetermined circuit panel mounting locations 72, 74, and 76 in addition to the end mounting location utilized in FIG. 4. As will be discussed in detail hereafter, the circuit panel 24 may be mounted in one of the circuit panel mounting locations based on the desired relative positioning of the circuit panel 24 and the generator 22 or based on the length of the generator 22. The circuit panel 24 may extend along an end of the frame 30 as shown in FIGS. 1 through 4, in which case it lies in a plane generally transverse to the alternator axis B in illustrated alternator-based EPG arrangement. The circuit panel may alternatively extend along one of the generally opposed sides of the frame 30 as shown in FIGS. 5A through 5D, in which case the panel 24 lies in a plane generally parallel to the alternator axis B.

The circuit panel 26 need not be positioned immediately adjacent and end or side of the frame 30 but could instead be spaced inwardly from the margin of the frame 30. In the context of alternator-based power generation arrangements 20, the end of the frame is considered to be the margin that extends transverse to the alternator axis B and the sides are margins that extend generally parallel to the alternator axis B. Alternatively, an end of a frame can be considered a relatively shorter side margin whereas a side of frame can be considered a relatively longer side margin, especially in the case of a rectangular frame structure. As apparent, although the frame 30 is shown as a generally rectangular structure with generally parallel opposed sides, other shapes and configurations can be used. In some instances, for example if the components are to be mounted to an underlying structure, a frame 30 may not be necessary or the underlying structure may be considered a frame.

INDUSTRIAL APPLICABILITY

This cabling guide described above can be used to readily provide a power generation arrangement in which the circuit panel can be positioned relative to the generator at one of a plurality of circuit panel locations. Use of the cabling guide in this manner is conveniently described in the context of a custom order process in which a customer is permitted to specify one of a plurality of selectable configurations. By way of example only, the configurations can vary based on the relative positioning of the circuit panel to the generator or on the alternator length in traditional alternator-based EPG arrangements. Based on the configuration specified in the customer order, an EPG arrangement can be constructed by mounting a generator to a frame, mounting a circuit panel to the frame in the specified location, and electrically connecting the generator to the circuit panel by power transmission cabling extending through a cabling guide as described above. The order in which the mounting activity occurs is unimportant. The customer order can be accepted in any suitable manner such as traditional paper order or electronic orders received via the Internet or otherwise. The orders can be processed manually or through suitable electronic order processing systems.

Based on the configuration specified in the customer order or otherwise intended, the cabling guide is positioned in an appropriate rotary position such that the cabling aperture(s) open generally toward the circuit panel as shown in the figures. Power transmission cabling can be connected between the generator terminals and the circuit panel. If cabling conduits are used, the cabling is extended through the conduits prior to final connection of the cabling to the circuit panel and the generator terminals. The cabling conduits can thereafter be connected to the circuit panel and the cabling guide, although it will be apparent that one end of each cabling conduit might be connected prior to extending the cabling through the conduit.

Use of the rotary cabling guide as described above permits accommodation of multiple circuit panel positions without requiring the complex and expensive customized cabling enclosures or trunk runs of prior EPG arrangement, thus reducing the cost and complexity. Use of the rotary cabling guide as described above can also shorten order fulfillment time because the cabling guide can be held in inventory by the EPG arrangement manufacturer rather than being custom-made upon or after order receipt since the cabling guide accommodates various configurations. This also optionally permits pre-assembly of parts of the EPG arrangement even prior to order receipt, thus further permitting a reduction in order fulfillment time if desirable. For example, the EPG arrangement could be pre-assembled prior to order receipt except for mounting of the circuit panel and connection of the power transmission cabling between the circuit panel and the generator. The cabling guide as described above also makes locating the circuit panel (and particularly the breaker circuits) more practical, the allowing use of acoustic enclosures with less concern over internal interference with airflow paths. Although several advantages of the rotary cabling guide are described, those skilled in the art will recognize that the cabling guide need not be used in a manner to provide each and every possible advantage.

Although selected embodiments of the invention are described above and illustrated in the drawings, those skilled in the art will recognize that various changes and modifications can be made without departing from the scope of the following claims.

What is claimed is:

1. A method for providing an electric power generation (EPG) arrangement, comprising the steps of:
   receiving a customer order for an EPG arrangement based on a desired configuration of a circuit panel and a generator;
   positioning the circuit panel and the generator in response to the desired configuration;
   positioning a cabling guide relative to the generator in one of a selectable plurality of rotary positions;
   extending power transmission cabling such that the cabling extends through the cabling guide; and
   electrically connecting the power transmission cabling to the circuit panel and the generator.

2. A method, as set forth in claim 1, further including the step of providing the EPG arrangement with the desired configuration to the customer.

3. A method, as set forth in claim 1, wherein receiving a customer order for an EPG arrangement based on a desired configuration of a circuit panel and a generator includes the step of receiving a customer order for an EPG arrangement based on a desired position of the circuit panel relative to the generator.

4. A method, as set forth in claim 3, wherein positioning a cabling guide relative to the generator includes the step of positioning the cabling guide in a rotary position as a function of the desired position of the circuit panel relative to the generator.

5. A method, as set forth in claim 1, wherein positioning the circuit panel and the generator includes the step of positioning the circuit panel and the generator on a base having a plurality of predetermined mounting locations for the circuit panel relative to the generator.

6. A method for ordering an electric power generation (EPG) arrangement, comprising the steps of:
   determining a desired EPG arrangement as a function of customer requirements;
   submitting an order for the desired EPG arrangement; and
   receiving the desired EPG arrangement having a circuit panel positioned relative to a generator, and a cabling guide positioned in a selectable rotary arrangement to allow for electrical connection between the positioned circuit panel and the generator.

7. A custom order process for specifying an electric power generation (EPG) arrangement, comprising the steps of:
   determining from a customer a desired positioning of a circuit panel relative to a generator;
   positioning the circuit panel in accordance with the customer desired position;
   mounting a cabling guide to the EPG arrangement;
   rotating the cabling guide to one of a selectable plurality of rotary positions to allow for electrical connection between the circuit panel and the generator; and
   electrically connecting the circuit panel to the generator using power transmission cabling routed through the cabling guide.

* * * * *